United States Patent
Cho et al.

(10) Patent No.: US 8,434,141 B2
(45) Date of Patent: Apr. 30, 2013

(54) SYSTEM FOR PREVENTING NORMAL USER BEING BLOCKED IN NETWORK ADDRESS TRANSLATION (NAT) BASED WEB SERVICE AND METHOD FOR CONTROLLING THE SAME

(75) Inventors: Hark Su Cho, Anyang-si (KR); Young Kook Noh, Seoul (KR)

(73) Assignee: Wins Technet Co., Ltd., Seongnam (KR)

(*) Notice: Subject to any disclaimer, the term of this patent is extended or adjusted under 35 U.S.C. 154(b) by 131 days.

(21) Appl. No.: 13/039,373

(22) Filed: Mar. 3, 2011

(65) Prior Publication Data

US 2011/0252469 A1 Oct. 13, 2011

(30) Foreign Application Priority Data

Apr. 12, 2010 (KR) .................. 10-2010-0033216

(51) Int. Cl.
*H04L 29/08* (2006.01)
(52) U.S. Cl.
USPC ............... 726/13; 726/3; 726/14; 726/15

(58) Field of Classification Search .......... 726/13
See application file for complete search history.

(56) References Cited

U.S. PATENT DOCUMENTS

| 7,107,348 B2 * | 9/2006 | Shimada et al. ............ 709/229 |
| 2004/0139227 A1 * | 7/2004 | Takeda ...................... 709/245 |
| 2009/0144806 A1 * | 6/2009 | Gal et al. ...................... 726/3 |

OTHER PUBLICATIONS

Du, Ping, and Akihiro Nakao. "DDoS Defense Deployment with Network Egress and Ingress Filtering." 2010 IEEE International Conference on Communications (ICC), pp. 1-6.*

* cited by examiner

*Primary Examiner* — Taghi Arani
*Assistant Examiner* — Narciso Victoria
(74) *Attorney, Agent, or Firm* — Patent Office of Dr. Chung Park

(57) ABSTRACT

A system for preventing normal user from being in network address translation(nat)-based web service and a method for controlling the same are disclosed. The system discriminates between an attacker PC and a normal user PC that use the same public IP address in the NAT network, blocks a Web-page request generated from the attacker PC, processes a Web-page request of a normal user PC, and makes an Internet service of the normal user PC possible.

2 Claims, 5 Drawing Sheets

| User source IP | Web-server destination IP | Web-server destination port | |
|---|---|---|---|
| 10.10.10.1 | 211.222.195.5 | 80 | |
| | | | |

SYSTEM FOR PREVENTING NORMAL USER BEING BLOCKED IN NETWORK ADDRESS TRANSLATION (NAT) BASED WEB SERVICE AND METHOD FOR CONTROLLING THE SAME

CROSS-REFERENCE TO RELATED APPLICATION

This application claims priority to and the benefit of Korean Patent Application No. 10-2010-0033216 filed in the Korean Intellectual Property Office on Apr. 12, 2010, the entire contents of which are incorporated herein by reference.

BACKGROUND OF THE INVENTION

1. Field of the Invention

The present invention relates to a Network Address Translation (NAT)—supported Distributed Denial of Service (DDOS) attack security device which can prevent a DDOS attack in which an attacker or intruder of a NAT-based network transmits excessive traffic (such as excessive Transmission Control Protocol (TCP) session connection requests or Web-page requests) to a Web server so that a normal user is unable to smoothly receive a Web service from the Web server due to the occurrence of excessive traffic, and identify only a normal user who has the same Internet Protocol (IP) address as the attacker, such that the normal user can normally use the Web service of the Web server.

2. Description of the Related Art

In general, in association with Network Address Translation (NAT) technology, a current Internet address system is composed of 32 bits, and the number of public Internet Protocol (IP) addresses is limited.

When using NAT, a multiple of Personal Computers (PCs) in an internal network can simultaneously use the same public IP address through.

The NAT technology can be used as a technology for preventing the access of a fraudulent user initiated by external attack, such that it has been widely used in most networks.

If an attacker PC is present in an NAT-based network, all the normal users who use the same public IP address in the NAT network cannot receive the Internet service due to the IP blocking of one attacker PC.

Nowadays, most DDOS devices have widely used for an IP-based blocking method to protect a Web server from external attack as well as to prevent excessive traffic.

Provided that conventional security devices detect TCP connection of more than a traffic threshold value established in the network, the conventional security devices block connection of the corresponding IP address for a predetermined period of time, and user PCs assigned the same IP address are unable to use a network service.

SUMMARY OF THE INVENTION

Accordingly, the present invention is directed to a system for preventing a normal user from blocking from an NAT— based Web service and a method for controlling the same that substantially obviates one or more problems due to limitations and disadvantages of the related art.

Therefore, the present invention has been made in view of the above problems, and it is an object of the present invention to provide a system which blocks attack traffic by registering an IP address detected as the source of a DDOS attack in a blacklist, and enables normal users assigned the same public IP address through an NAT network to freely use a Web service of the Web server without any restriction.

In more detail, if a security device for detecting a DDOS attack detects excessive traffic of more than a threshold value, the corresponding IP address causing the excessive traffic is registered in a blacklist. In this case, if the conventional security device according to the related art blocks connection of the corresponding IP address, all normal users in the NAT network according to the related art cannot access the corresponding IP. In order to solve these problems, the system according to the present invention has an object to prevent normal users from blocking from the corresponding IP.

The system for preventing a normal client from blocking from a Web service according to embodiments of the present invention includes a packet transmission/reception unit, a blacklist rule table, a TCP SYN proxy unit, a Uniform Resource Locator (URL) Redirect unit, a virtual IP restoring unit, and a virtual IP translator unit.

In accordance with the present invention, the above and other objects can be accomplished by the provision of a system for preventing a normal user from being disconnected from a Web service in a Network Address Translation (NAT) network, the system includes: a packet receiver for receiving data from a client, and a packet transmitter for transmitting the received data to the client; and an NAT data unit for receiving packet information from the packet receiver and transmitting data to the packet transmitter. The NAT data unit includes a blacklist rule table matching unit for determining whether received data matches data of packet information stored in a blacklist rule table, and blocking packets other than packets of TCP session connection related to the matched client, and a Uniform Resource Locator (URL) redirect unit for transmitting, when request data of the client is a packet requesting a Web page of a corresponding Web server, not only response data translated into a virtual IP address of the corresponding Web server but also specific data which allows the client to sever session connection with the Web server and access the Web server through a virtual Internet Protocol (IP) address assigned to the corresponding client.

The NAT data unit may include: a Transmission Control Protocol (TCP) synchronous (SYN) proxy unit for generating, when the request data of the client is a TCP session connection packet, a TCP SYN-ACK response, and transmitting the generated TCP SYN-ACK response; a virtual IP restoring unit for receiving a packet from the client, restoring a virtual Web-server IP address into an actual Web-server IP address, and transmitting the resultant packet to the actual Web server; and a virtual IP translator for receiving the packet from the Web server in response to the request of the client, translating the received packet into a Web-server virtual IP address transmitted from the Web server to the client, and performing packet transmission. The URL Redirect unit includes URL Moved or URL Redirect HTTP data for accessing a virtual IP address in the transmission packet, and transmits the resultant packet to the corresponding client through the packet transmitter, and the blacklist rule table of the blacklist rule table matching unit includes source IP data of an attacker client, destination IP data of the Web server, and destination port data of the Web server.

In accordance with another aspect of the present invention, a system for preventing a normal user from blocking from a Web service in a Network Address Translation (NAT) network is disclosed. The system is located between a client and a Web server, receives data requesting information of the Web server from the client, halts transmission of packets other than a packet for Transmission Control Protocol (TCP) session connection according to a matching result obtained from a blacklist rule table, transmits specific data for severing current session connection to virtual IP information data of the corresponding Web server, and determines that a user of the received information is a normal user when the corresponding client requests information from the Web server through virtual IP information of the corresponding Web server.

In accordance with yet another aspect of the present invention, a method for controlling a system which prevents a normal user from blocking from a Web service in a Network Address Translation (NAT) network includes: receiving data requesting information of a Web server from a client; determining, by a blacklist rule table matching unit of a Network Address Translation (NAT) data unit, whether data received from the client matches data of a blacklist rule table; blocking packets other than a Transmission Control Protocol (TCP) session connection packet of the corresponding client, when the data received from the client matches the data of the blacklist rule table; generating, by a TCP SYN proxy unit, a TCP SYN-ACK response signal on behalf of the Web server if the matched client packet is a TCP session connection packet, and performing packet transmission; and performing a Uniform Resource Locator (URL) redirect process for transmitting a specific signal to the corresponding client when the matched client packet is a Web-page request packet, wherein the specific signal includes data translated into virtual IP information of the corresponding Web server, data for allowing a Web page to be re-requested, and data for severing current session connection.

The performing of the URL Redirect process may include: upon receiving virtual IP data of the corresponding Web server from the corresponding client, determining whether the received data belongs to a normal client; restoring, by a virtual IP restoring unit, virtual IP information of the corresponding Web server into actual IP information, and transmitting information request data to the corresponding Web server; and transmitting, by a virtual IP restoring unit, virtual IP information of the corresponding Web server and information data of the corresponding Web server requested by the client.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
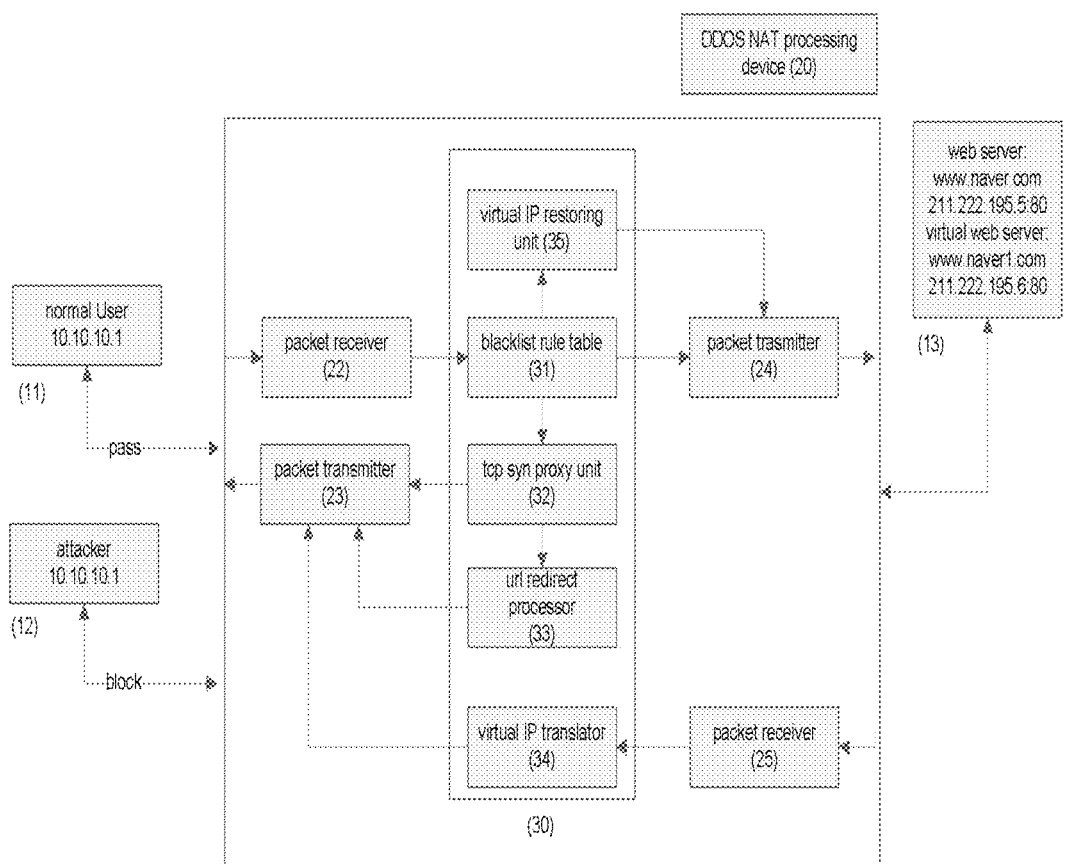
FIG. 1 is a configuration view illustrating a system for preventing block of a normal user according to the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 2:
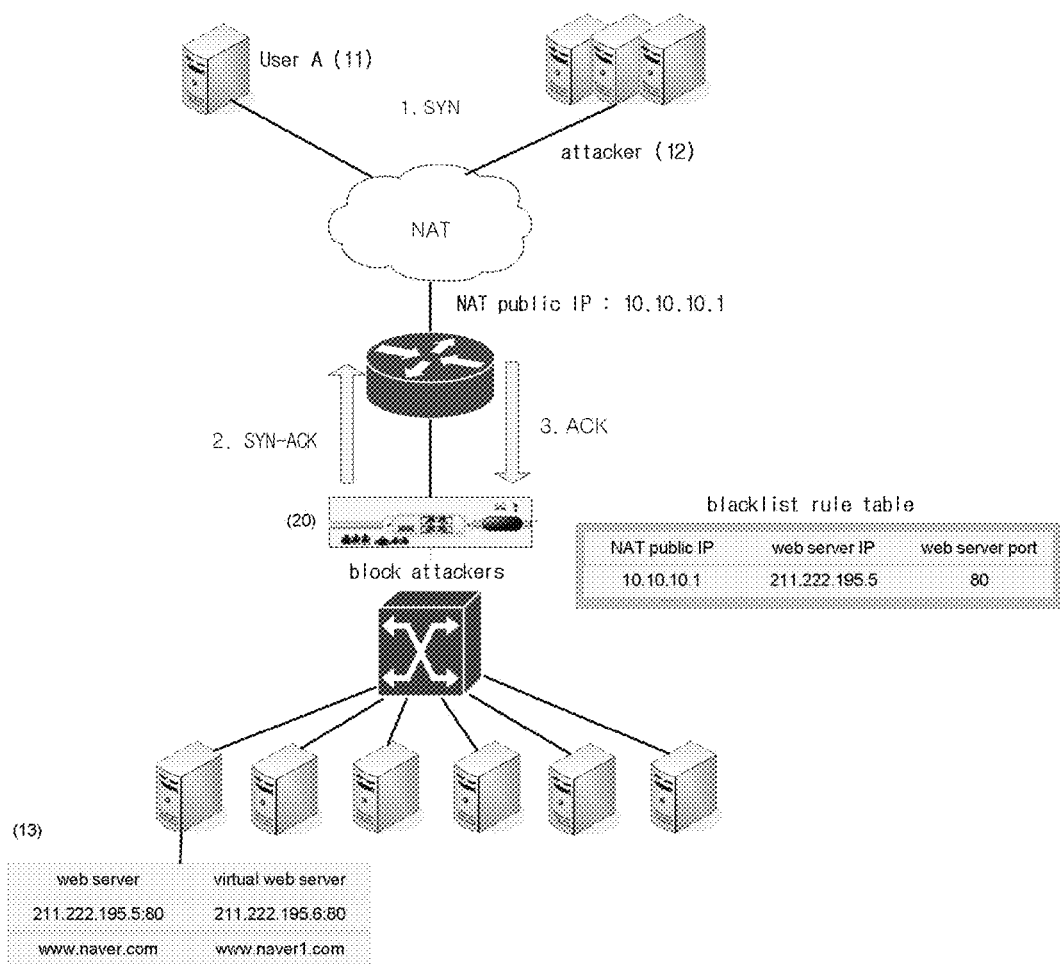
FIG. 2 is an exemplary view illustrating operations of a blacklist rule table matching unit for use in the system for preventing block of a normal user according to the present invention.
Figure 3:
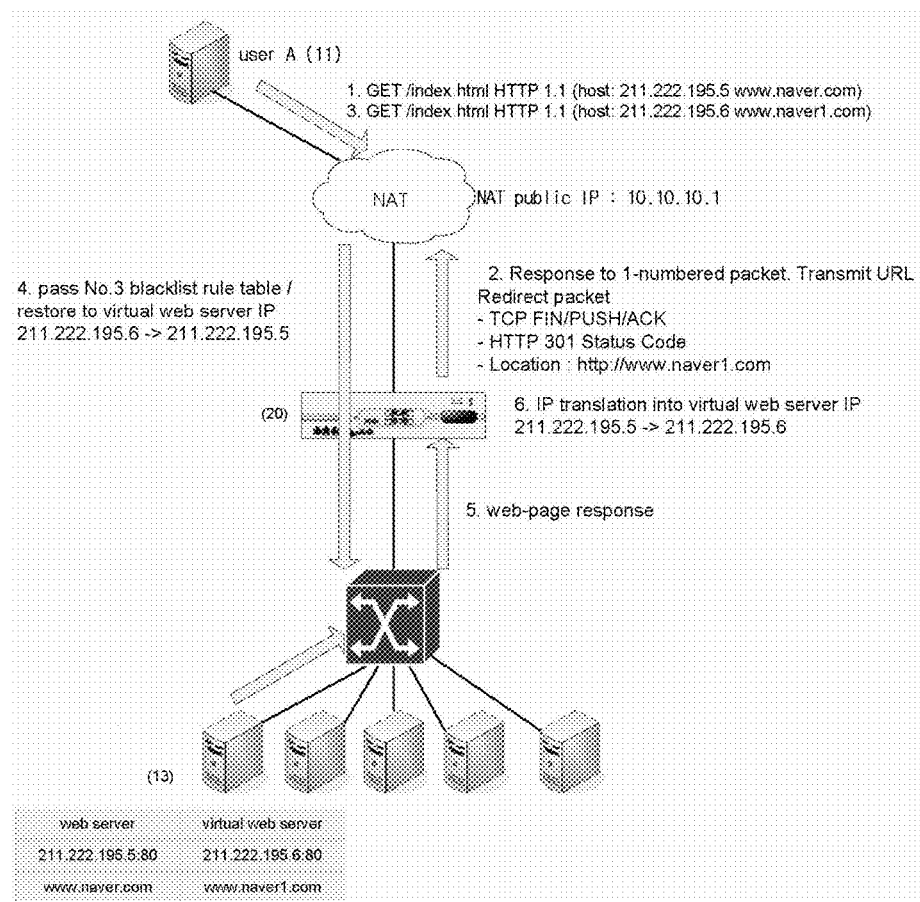
FIG. 3 is an exemplary view illustrating packet processing operations for preventing block of a normal user using the system for preventing block of the normal user according to the present invention.
Figure 4:
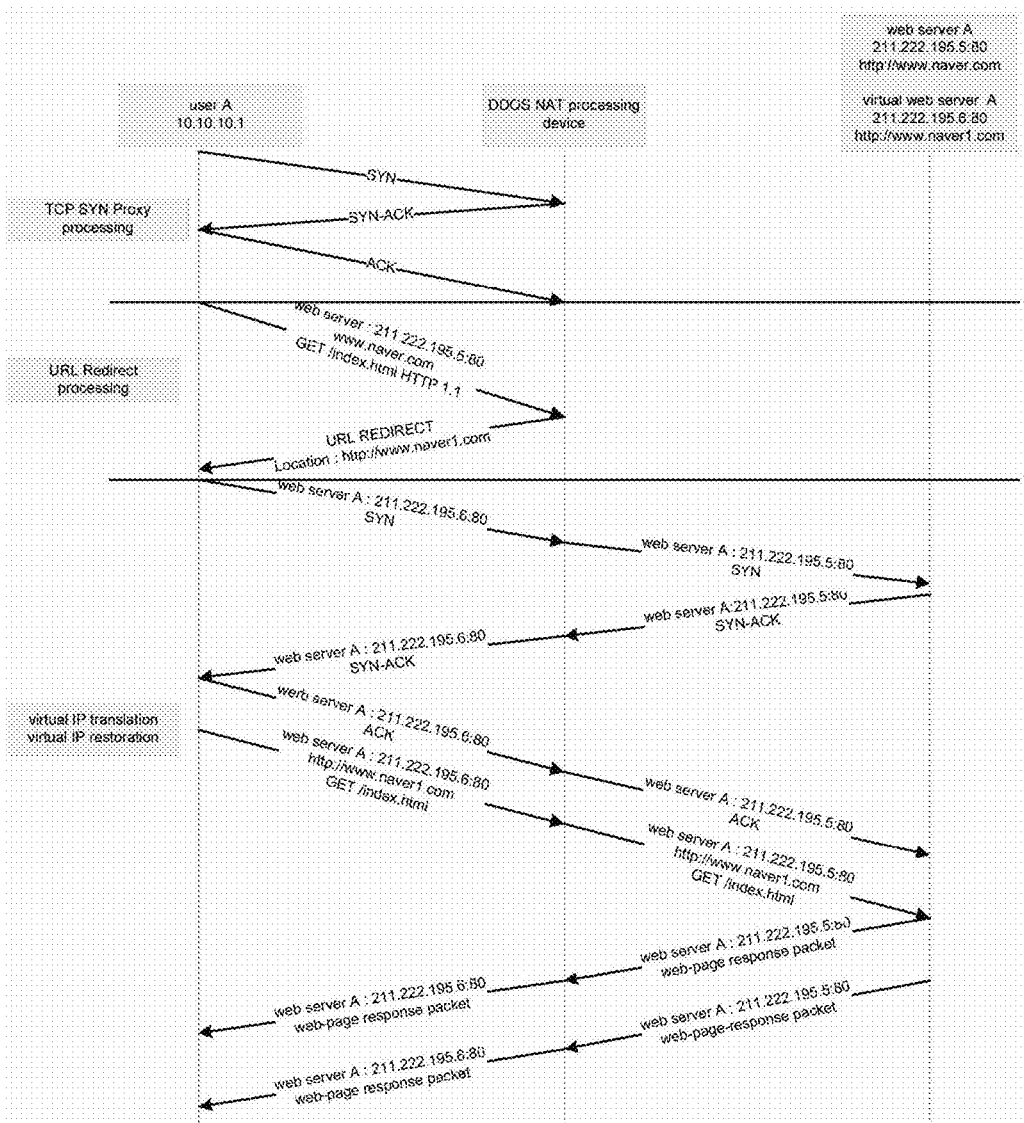
FIG. 4 is an exemplary view illustrating actions of individual packet processing operations for use in the system for preventing block of a normal user according to the present invention.
Figures 5, 6:
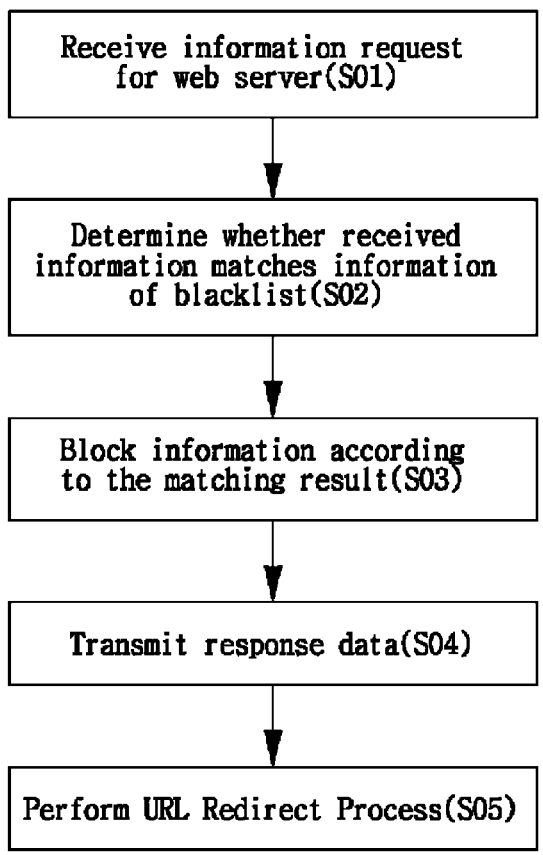
FIG. 5 is an exemplary configuration view illustrating a blacklist rule table for use in the system for preventing block of a normal user according to the present invention.
FIG. 6 is a flowchart illustrating a method for controlling the system for preventing block of a normal user according to the present invention.

FIG. 1 is a configuration view illustrating a system for preventing a normal user from blocking from an NAT-based Web service according to the present invention. FIG. 2 is an exemplary view illustrating an operation process of a blacklist rule table matching unit for use in the system for preventing block of a normal user according to the present invention. FIG. 3 is an exemplary view illustrating packet processing operations for preventing block of a normal user using the system for preventing block of the normal user according to the present invention. FIG. 4 is an exemplary view illustrating actions of individual packet processing operations for use in the system for preventing block of a normal user according to the present invention. FIG. 5 is an exemplary configuration view illustrating a blacklist rule table for use in the system for preventing block of a normal user according to the present invention. FIG. 6 is a flowchart illustrating a method for controlling the system for preventing block of a normal user according to the present invention.

The present invention relates to a system 20 for preventing a normal user from blocking from an NAT-based Web service, such that the system can be used as a Distributed Denial of Service (DDOS) defense system.

Referring to FIGS. 1 to 6, the system 20 according to the present invention includes a packet receiver 22 or 25 for receiving packets from a client or a server, a packet transmitter 23 or 24 for transmitting data to the client or the server, and a Network Address Translator (NAT) data unit 30 for receiving packet information from the packet receiver 22 or 25 and transmitting resultant data to the packet transmitter 23 or 24.

The NAT data unit 30 includes a blacklist rule table matching unit 31, a TCP SYN proxy unit 32, etc. The blacklist rule table matching unit 31 identifies whether the packet information received from the packet receiver 22 or 25 matches data of packet information stored in a blacklist rule table. If the received packet information matches the stored packet information of the blacklist rule table, the blacklist rule table matching unit 31 blocks the remaining packets other than TCP session connection packets from the matched client. If request data of the matched client decided by the blacklist rule table matching unit 31 is determined to be a packet for TCP session connection, the TCP SYN proxy unit 32 generates a TCP SYN-ACK response signal on behalf of a Web server, and transmits the generated TCP SYN-ACK response signal.

The blacklist rule table matching unit 31 includes a blacklist rule table. The blacklist rule table matching unit 31 identifies a client who causes an abnormal (or illegal) connection request or excessive Web-page traffic as an attacker, such that it stores information about the corresponding attacker in the blacklist rule table as represented by FIG. 5.

Therefore, if the corresponding client is identified as an attacker, the system 20 according to the present invention prevents the remaining packets other than TCP session connection packets from accessing a Web server, such that it can protect the Web server from the attacker.

In more detail, if the corresponding client is determined to be the attacker, the TCP SYN proxy unit 32 performs TCP SYN-ACK processing on behalf of the Web server, such that it can protect the Web server from the attacker.

The NAT data unit 30 further includes a Uniform Resource Locator (URL) redirect unit 33. The URL Redirect unit 33 is described in detail in the following. If request data of the corresponding client is determined to be a packet requesting a Web page of the corresponding Web server, the NAT data unit 30 transmits a specific signal to the corresponding client through the packet transmitter 23. In this case, the specific signal transmitted to the client includes response data translated into a virtual IP address of the corresponding Web server and URL Redirect data or URL Moved HTTP data for allowing the client to sever session connection of an actual Web server and access the Web server through a virtual IP address. As a result, the NAT data unit 30 transmits the specific signal to the corresponding client through the packet transmitter 23.

Specifically, the URL Redirect unit 33 can process received data not as information of the actual Web server but as data including a virtual IP address, such that the URL Redirect unit 33 can protect the corresponding Web server from the attacker without exposing information of the Web server to the attacker.

The NAT data unit 30 further includes a virtual IP restoring unit 35 and a virtual IP translator 34 to implement conversion of virtual-IP data and real-IP data. In more detail, the virtual IP restoring unit 35 receives data from the client causing a TCP SYN-ACK response, restores a virtual Web-server IP address into an actual Web-server IP address, and transmits data to the real Web server. The virtual IP translator 34 receives packets from the Web server in response to a request of the client, and translates the received packets into other packets for the Web-server virtual IP address that has been transmitted to the client, such that packet transmission is achieved.

Therefore, if the client is identified as an attack client during the matching process through the blacklist rule table, data of a normal user will not satisfy a predetermined blacklist matching condition based on the blacklist rule table, such that a normal user can access the Web server, but an attacker is prevented from accessing the Web server in response to the blacklist rule table matching condition, such that the corresponding Web server can be protected from the attacker. In addition, the NAT data unit 30 identifies whether a corresponding client is a normal client using the TCP SYN proxy unit 32, the URL Redirect unit 33, the virtual IP translator 34, the virtual IP restoring unit 35, etc., such that it can protect the Web server from the attacker and allow a normal client or user to stably use the Web server.

In association with the system 20, serving as a DDOS attack defense device, for preventing a normal user from blocking from an NAT-based Web service, the blacklist rule table of the blacklist rule table matching unit 31 includes source IP data of an attack client, destination IP data of the Web server, and destination port data of the Web server.

As can be seen from the Denial of Service (DOS) or Distributed Denial of Service (DDOS) attack, when the system 20 receives an abnormal connection request and excessive Web-page request traffic, a method for controlling the system 20 that prevents a normal user from blocking from the NAT-based Web service according to the present invention will hereinafter be described with reference to FIG. 6. FIG. 6 is a flowchart illustrating a method for controlling the system for preventing block of a normal user according to the present invention. Referring to FIG. 6, the system 20 receives data from the client at step S01 requesting information from the Web server. In step S01 of receiving the Web-server information request, if a client causes abnormal connection request or excessive Web-page request traffic as in the DOS or DDOS attack, the system 20 determines the client to be an attacker, and stores information about the attack client in the blacklist rule table. Therefore, the system 20 determines whether information of the received client matches the stored information of the blacklist rule table. If the received client information matches the stored information, the system 20 determines the corresponding client to be the attacker.

In more detail, the blacklist rule table matching unit 31 of the NAT data unit 30 in the system 20 decides whether data received from a client matches data stored in the blacklist rule table at step S02. For convenience of description, step S02 may also be referred to as a blacklist matching decision step.

In the blacklist matching decision step S02, if information of the corresponding client matches data of the blacklist rule table, the system 20 blocks the remaining packets other than TCP session connection packets of the corresponding client at step S03, such that the corresponding Web server can be protected from a fraudulent or malicious user. For convenience of description, step S03 may also be referred to as a matching block step.

If it is determined that a packet of the matched client is identical to a TCP session connection packet at step S03, the TCP SYN proxy unit 32 generates a TCP SYN-ACK response on behalf of the Web server and transmits the resultant packet at step S04. For convenience of description, step 04 may also be referred to as a response data transmission step. As a result, the system 20 can determine whether the corresponding client is a normal client or a fraudulent client.

In the matching block step S03, if the matched client packet is identical to Web-page request packet, the URL Redirect unit 33 performs URL Redirect processing step at step S05. In the URL Redirect processing step S05, the URL Redirect unit 33 transmits a specific signal to the corresponding client, wherein the specific signal includes data converted into virtual IP information of the corresponding Web server, data for re-requesting a Web page, and data for severing current session connection, such that it is determined whether the corresponding client is a normal client who desires to access the corresponding Web server at step S05.

In the aforementioned URL Redirect processing step S05, upon receiving data including virtual IP data of the corresponding Web server from the corresponding client, a target client is identified as a normal client. The virtual IP restoring unit 35 restores virtual IP information of the corresponding Web server into real IP information, and transmits information request data to the corresponding Web server. In addition, in the URL Redirect processing step S05, the virtual IP translator 34 transmits not only the virtual IP information of the corresponding Web server but also the corresponding data requested by the corresponding client system the Web server information data.

Detailed constituent elements of the system 20 for preventing a normal user from blocking from the Web service according to the present invention will hereinafter be described with reference to the appended drawings. The system 20 is located among a user (i.e., a normal user) 11, an attacker 12, and a Web server 13. As can be seen from FIG. 1, the system 20 includes packet receivers 22 and 25, packet transmitters 23 and 24, an NAT data unit 30 connected to the packet receivers 22 and 25 and the packet transmitters 23 and 24, and the like.

The NAT data unit 30 includes a blacklist rule table matching unit 31, a URL Redirect unit 33, a virtual IP translator 34 for translating an IP address of the server into a virtual IP address, a virtual IP restoring unit 35 for restoring a virtual IP address into an actual IP address, etc.

The packet receiver 22 receives packet data of a normal user 11 and packet data of an attacker 12 over a network, and transmits the received packet data to the NAT data unit 30. The NAT data unit 30 receives the transmitted packet data, and determines whether the received data is information of the attacker through the matching process.

Therefore, the blacklist rule table matching unit 31 determines whether the received information is information of the attacker. If the received information is determined to be the attacker information according to the matching result, the blacklist rule table matching unit 31 immediately blocks packets belonging to the attacker. That is, the blacklist rule table matching unit 31 determines the remaining packets other than TCP session connection packets to be attacker packets, such that it immediately blocks connection of the attacker packets.

On the other hand, under the condition that the received information is information of a normal user, if the information is a normal TCP session connection packet during the matching decision processing step of the blacklist rule table matching unit 31, the TCP SYN proxy unit 32 shown in FIG. 4 generates the TCP SYN-ACK response on behalf of the Web server 13, and transmits the resultant packets to the user through the packet transmitter 23.

In addition, if data information received from the user is an HTTP Web-page request packet, the URL Redirect unit 33 generates URL Redirect packets and transmits the generated packets to the packet transmission device. If the HTTP Web-page request is a virtual Web-server address, the virtual IP restoring unit 35 translates the received information into packets of an IP address of the real Web server 13, and transmits the translated IP packets to the Web server 13 through the packet transmitter 24. The virtual IP translator 34 translates the packets received from the Web server 13 through the packet receiver 25 into virtual IP packets that have been transmitted to the normal user 11, and transmits the resultant packets to the user through the packet transmitter 23, such that the NAT-based packet data processing device for a DDOS attack defense device is configured.

Next, an attack defense process for use in the system for preventing a normal user from blocking from the NAT-based Web service for the DDOS attack defense device according to the present invention will hereinafter be described with reference to the appended drawings.

That is, in the DDOS defense NAT processing devices shown in FIG. 2, if excessive Web-page request traffic for the Web server or an abnormal connection request of the attacker is detected through the detection engine, the system 20 according to the present invention stores information about the NAT and the Web server in a database (DB) of the blacklist rule table matching unit 31. As a result, the NAT public IP address (10.10.10.1), the Web-server IP address (211.222.195.5), and the Web-server port (80) are registered in a table of the database (DB) of the blacklist rule table matching unit 31.

A packet received in the NAT processing device for the DDOS attack defense is analyzed. Provided that the analyzed packet result corresponds to the client IP address (10.10.10.1), the Web server IP address (211.222.195.5), and the Web server port (80), the received packet data matches a data table of the blacklist rule table matching unit 31, and is determined to be an attacker, the blacklist rule table matching unit 31 transmits a control signal for immediately blocking the corresponding attack packet other than TCP session connection packets to other control parts.

The TCP session connection—associated packets are transmitted to the TCP SYN proxy unit 32. The TCP SYN proxy unit 32 is operated as a device for generating a SYN-ACK response to the TCP SYN session connection request on behalf of the Web server 13. That is, the TCP SYN proxy unit 32 includes a proxy device that does not transmit an abnormal TCP connection request to the Web server 13 and blocks it from the Web server 13.

The TCP SYN proxy unit 32 blocks any of a synchronous (SYN) flooding attack and a session connection request attack for the Web server 13. The SYN flooding performs memory allocation when the server receives a synchronous (SYN) packet due to the TCP session connection request. If the SYN flooding attack occurs, a large amount of SYN packets are received, the SYN flooding method cannot implement normal TCP connection using a large capacity of a memory. Therefore, the blacklist rule table matching unit 31, the TCP SYN proxy unit 32 and the like according to the present invention block attacker data belonging to the attacker without transmitting the attacker data to the Web server 13, such that information of the normal user can be protected.

In the system 20 for preventing a normal user from blocking from the NAT-based Web service for the DDOS attack defense according to the present invention, the operation for the normal user is as follows.

That is, as shown in FIG. 3, if the client system outputs a Web-page request "GET/index.html HTTP 1.1", and changes a host address of the Web server to "www.naver1.com", such that the client severs current TCP session connection, connects to a virtual host, and transmits a response packet for confirming a normal user to a user.

The URL Redirect unit 33 establishes "FIN, PUSH, ACK=1" in a TCP header to sever current session connection, generates not only "URL Moved or URL Redirect 301/302 code" indicating the HTTP protocol standard but also "Location: www.naver1.com response packet", and transmits them to the client. The reason why "TCP FIN, PUSH, ACK=1" is established is to ask the client system to generate a new TCP session request after severing current session connection. "HTTP URL Redirect" is an HTTP response packet that informs the client system that an address of a currently-requested page has changed such that the client system performs re-requesting using an address given in a "Location" field. Packet configuration is as follows, and the following packets can be generated as shown in (a) to (c).

(a) Internet Protocol, src: 10.10.10.1, dst: 211.222.195.5
(b) Transmission Control Protocol (TCP): dst_port: http (80), FIN: 1, PUSH: 1, ACK: 1
(c) Hypertext Transfer Protocol:
HTTP 1.1 301 Moved Permanently
Content-Length: 0
Location: http://www.naver1.com
Connection: close In the aforementioned packet configuration, the part (a) relates to an IP header and shows source and destination IPs. The part (b) shows source and destination ports and a TCP FLAG. The part (c) shows an HTTP 1.1. 301 state code including HTTP header information, and relates to a response code for indicating "URL Moved/Redirect". The Location field indicates a changed server URL address.

In the aforementioned embodiment, the system 20 transmits HTTP packet information for indicating address change from "www.naver.com" to "www.naver1.com". If the user A (10.10.10.1) transmits a Web-page request to the Web server (211.222.195.6:www.naver1.com:80) and it is determined that the user A (10.10.10.1) is determined to be a normal user 11, the blacklist rule table matching unit 31 determines that information of the user A acting as the normal user is not matched to the stored information, so that the access of the normal user 11 is not blocked and therefore the normal user 11 can freely connect to the Web server.

The virtual IP restoring unit 35 restores the virtual Web server address (211.222.195.6:www.naver1.com:80) into an actual server IP address (211.222.195.5:www.naver1.com: 80), and transmits the restored actual server IP address to the Web server A.

Next, as to packets received from the Web server A, a source address transmitted from the Web server A to the user A is converted into a virtual IP address (211.222.195.6) through the virtual IP translator 34, such that the resultant packets indicating the virtual IP address (211.222.195.6) are transmitted to the user A. As a result, the aforementioned packets received from the Web server A do not match the stored information of the blacklist rule table matching unit 31, such that the packets are determined to be packets of the normal user 11. That is, the resultant packets belonging to the normal user 11 pass through the blacklist rule table matching unit 31 without any limitation, such that the normal user 11 can gain access to the Web server.

Most DDOS attack tool methods have widely used a method for unidirectionally transmitting large amounts of traffic to the server without generating a response for a signal of the server so as to attack the server. If a request to be identified is a Web-page request caused by the attacker PC (10.10.10.1) 12, the system 20 does not generate a response to a packet from the ACK step 3 shown in FIG. 2, and outputs only a Web-page request.

If the system 20 receives "GET/index.html HTTP 1.1" (serving as a Web-page request packet) for the Web server (211.222.195.5:80), attacker PC (10.10.10.1) information, and an information request packet for the Web server (211.222.195.5:80), the black lust rule table matching unit 31 blocks the attacker PC from accessing the Web server.

In contrast, in the case where information to be identified is not registered in an attacker list stored in a database (DB) of the blacklist rule table matching unit 31, and a new ACK request is identified as information of the virtual Web server and is determined to be a Web-page request, the blacklist rule table matching unit 31 determines the corresponding information to be information of the normal user, such that the system 20 transmits information of the corresponding Web server to the normal user 11 through the virtual IP restoring unit 35, the virtual IP translator 34, etc.

Therefore, the system 20 according to the present invention makes a distinction between the user A and the attacker PC that use the same IP address in the NAT, such that the system 20 blocks the attacker PC from accessing the Internet service of the Web server and prevents the normal user from blocking from the Web server. As a result, the normal user can use the Web service of the Web server without any problems.

As apparent from the above description, the present invention relates to a DDOS attack defense system. If excessive traffic exceeding a threshold value is registered in a Web server, the system according to the present invention registers the corresponding IP address in a blacklist, blocks all traffic of the blacklist IP, primarily blocks traffic of all users who have the same public IP address in the NAT network, and allows only normal user traffic other than attack traffic to access the Web server. That is, the system according to the present invention makes a distinction between a normal user and the fraudulent user (serving as an attacker), prevents attacker traffic from accessing the Web server, and allows only the normal user to access a Web service of the Web server.

Although the present invention has been described in connection with specific preferred embodiments, those skilled in the art will appreciate that various modifications, additions, and substitutions to the specific elements are possible, without departing from the scope and spirit of the present invention as disclosed in the accompanying claims.

What is claimed is:

1. A system for preventing a normal user from being blocked in Network Address Translation (NAT) - based web service, the system comprising:
   a packet receiver for receiving data from a client or a server;
   a packet transmitter for transmitting the received data to the client or the server; and
   a NAT data unit for receiving packet information from the packet receiver and transmitting data to the packet transmitter,
   wherein the NAT data unit includes
   a blacklist rule table matching unit for determining whether received data matches data of packet information stored in a blacklist rule table, and blocking packets other than packets of Transmission Control Protocol (TCP) session connection related to a matched client;
   a Uniform Resource Locator (URL) Redirect unit for transmitting, when request data of the matched client is a packet requesting a Web page of a corresponding Web server, a first data translated into a virtual Internet Protocol (IP) address of the corresponding Web server, a second data for severing current TCP session connection to the corresponding client and a third data for re-requesting the web page to the matched client and for determining, when re-requesting data from the matched client includes the virtual IP address of the corresponding Web server, the matched client as a normal client;
   a virtual IP restoring unit for restoring the virtual IP address into an actual IP address if a packet is received from the normal client, and transmitting the resultant packet to the Web server;
   a virtual IP translator for receiving the packet from the Web server in response to the request of the normal client, translating the received packet into the virtual IP address, and transmitting the packet to the normal client; and
   a TCP synchronous (SYN) proxy processor for generating, when the request data of the client is a TCP session connection packet, a TCP synchronous-acknowledge (SYN-ACK) response, and transmitting the generated TCP SYN-ACK response to the matched client.

2. A method for controlling a system which prevents a normal user from being blocked in Network Address Translation (NAT) - based web service, comprising:
   receiving data from a client requesting information of a Web server;
   determining, by a blacklist rule table matching unit, whether data received from the client matches data of a blacklist rule table;
   blocking packets other than a Transmission Control Protocol (TCP) session connection packet of the client, when the data received from the client matches the data of the blacklist rule table;
   generating, by a TCP synchronous (SYN) proxy unit, a TCP synchronous-acknowledge (SYN-ACK) response signal on behalf of the Web server if the data received from the client is a TCP session connection packet, and transmitting the TCP SYN-ACK response signal to the client;

generating and transmitting a specific signal to the client, by a Uniform Resource Locator (URL) Redirect Unit, when the data received from the client is a Web-page request packet, wherein the specific signal includes a first data translated into virtual Internet Protocol (IP) information of the corresponding Web server, a second data for re-requesting a Web page, and a third data for severing current session connection;

determining the client as a normal client if the received data from the client includes the virtual IP data of the corresponding Web server;

upon receiving virtual IP data of the corresponding Web server from the normal client, restoring, by a virtual IP restoring unit, virtual IP information of the corresponding Web server into actual IP information, and transmitting information request data to the corresponding Web server; and translating, by a virtual translator, the actual IP information from the corresponding Web server into the virtual IP information, and transmitting the virtual IP information to the normal client.

* * * * *